US006673855B1

(12) United States Patent
Braga et al.

(10) Patent No.: US 6,673,855 B1
(45) Date of Patent: Jan. 6, 2004

(54) FLAME-PROOF POLYOLEFIN COMPOSITIONS

(75) Inventors: Vittorio Braga, Ferrara (IT); Paolo Goberti, Ferrara (IT); Ugo Zucchelli, Ferrara (IT); Roberta Marchini, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 193 days.

(21) Appl. No.: 09/913,390

(22) PCT Filed: Dec. 18, 2000

(86) PCT No.: PCT/EP00/12888

§ 371 (c)(1),
(2), (4) Date: Aug. 14, 2001

(87) PCT Pub. No.: WO01/48075

PCT Pub. Date: Jul. 5, 2001

(30) Foreign Application Priority Data

Dec. 23, 1999 (EP) .............................................. 99204494

(51) Int. Cl.$^7$ ................................................. C08K 5/34
(52) U.S. Cl. ........................ 524/86; 524/445; 524/446; 524/515; 524/847; 524/913
(58) Field of Search .......................... 524/515, 86, 445, 524/446, 847, 913

(56) References Cited

U.S. PATENT DOCUMENTS

| 4,350,797 A | | 9/1982 | Marzola et al. ............. 525/293 |
| 5,486,419 A | * | 1/1996 | Clementini et al. ......... 428/397 |
| 5,494,951 A | | 2/1996 | Braca et al. ................ 524/114 |
| 5,536,572 A | | 7/1996 | Braca et al. ................ 428/364 |
| 5,859,109 A | | 1/1999 | Weil et al. .................. 524/436 |
| 5,948,837 A | | 9/1999 | Cicchetti et al. ............ 524/100 |

FOREIGN PATENT DOCUMENTS

| EP | 0304030 | 2/1989 | |
| EP | 0400333 | 12/1990 | ......... C08F/297/08 |
| EP | 0472946 | 3/1992 | ......... C08F/297/08 |
| EP | 0572028 | 12/1993 | ............. C08F/8/46 |
| JP | 7330980 | 12/1995 | |

* cited by examiner

Primary Examiner—David W. Wu
Assistant Examiner—William Cheung

(57) ABSTRACT

The invention concerns polyolefin compositions with high flame resistance. The compositions comprise (percent by weight):

A) from 20 to 60% by weight of a heterophasic olefin polymer composition comprising a crystalline olefin polymer (a) and an elastomeric olefin polymer (b), said composition (A) being optionally modified with at least one functional monomer in an amount from 0.005% to 0.6% by weight with respect to the total weight of the total composition;

B) from 15 to 40% by weight of one or more than one inorganic hydrated fillers;

C) from 12 to 40% by weight of one or more than one organic flame retardants containing nitrogen in the molecule;

D) from 0 to 40% by weight of one or more than one inorganic anhydrous fillers.

Possible applications include the use as insulating material in electric wires and cables and the use as waterproofing sheets for roofs and tunnels.

18 Claims, No Drawings

FLAME-PROOF POLYOLEFIN COMPOSITIONS

This application is the U.S. national phase of International Application PCT/EP00/12888, filed Dec. 18, 2000.

The present invention concerns polyolefin compositions with high flame resistance. These compositions are suitable to be used in several applications, e.g. as insulating material in electric wires and cables, as extruded sheets for waterproofing roofs and tunnels, in manufacturing raceways and pipes, general purpose extruded articles and gaskets. Said compositions comprise a thermoplastic olefin polymer in admixture with an elastomeric olefin polymer, an inorganic hydrated filler capable to release water at the combustion temperature of the composition, an organic nitrogen-containing flame retardant compound and preferably an inorganic anhydrous filler. The polymeric components are preferably modified with a small amount of a functional monomer to improve the compatibility with the fillers. No crosslinking treatment is made on the compositions of the invention. It is known that inorganic hydrated fillers, such as magnesium hydroxide and aluminum hydroxide, when present in suitable amount in the polyolefin compositions afford to reach a good level of flame resistance.

In particular, said hydrated inorganic fillers improve the flame resistance of polyolefins as shown for instance by values of the L.O.I. (limiting oxygen index) as high as or even higher than 24–25%. To perform so effectively, the inorganic hydrated fillers must be present in relatively high amount, which involves a worsening of the physical mechanical properties, surface appearance of the extruded articles and electrical properties, in particular volume resistivity.

Inorganic anhydrous fillers are well-known inexpensive fillers, useful to improve physical mechanical properties and extrusion properties without a significant impairing of the excellent electrical properties of the olefin polymers.

Inorganic anhydrous and hydrated fillers do not produce smoke during combustion, are not corrosive and are not released from compositions if exposed to water or humidity.

Nitrogen containing organic compounds are also known for their flame retardant activity. Melamine in particular is used as organic filler to fire retard polymeric materials. Its action is supposed to be based on the dilution of the combustible gases from thermal degradation of the polymeric matrix with incombustible gases from sublimation and decomposition of melamine itself. The use of melamine has also the advantage to decrease the specific weight of the fire retarded materials. On the other hand, melamine is slightly soluble in hot water and is a relatively soft filler, which affects abrasion resistance of final items and mechanical properties. The combined use of inorganic hydrated fillers, inorganic anhydrous fillers and melamine compounds is shown in the Japanese published patent application Hei 7 (1995) 330980. This application describes compositions consisting of at least an elastomeric and usually crosslinked copolymer selected from ethylene/alpha-olefin, ethylene/alpha-olefin/diene and ethylene/vinyl acetate copolymers and of a mixture of additives able to give a high flame resistance, such a mixture comprising per 100 parts of polymer by weight:

from 50 to 300 parts by weight of an hydrated metal oxide,
from 1 to 40 parts by weight of a melamine compound,
from 1 to 50 parts by weight of talc.

The compositions disclosed in said patent application contain therefore from 21 to 75% by weight of hydrated metal oxide and from 0.2 to 21% by weight of the melamine compound referred to the total weight of the composition, the ratio of the percentage amounts of these compounds ranging therefore from about 1 to about 375.

In the working examples of the same patent application the minimum amount of hydrated metal oxide is about 46% referred to the total weight of the composition and the minimum ratio of the percentage amount of the hydrated metal oxide to the percentage amount of the melamine amount is about 4.7.

The total amount of the fillers in the polymeric compositions of said patent application is kept at a still acceptable low level, so avoiding an extreme worsening of the physical mechanical properties and of the volume resistivity. The obtained compositions are usually crosslinked to reach the best balance of the physical mechanical properties and can be used in typical applications of the elastomeric polymers.

On the other hand it is desirable to get a good balance of the flame resistance and physical mechanical properties also in the non-crosslinked polyolefin compositions comprising thermoplastic and elastomeric polymers.

Now the applicant has found that the best balance of flame resistance, physical mechanical properties, extrusion properties and volume resistivity in the case of non-crosslinked polyolefin compositions is obtained when the amount of inorganic hydrated fillers is less than or at most equal to 40% by weight with reference to the total weight of the composition. The present invention concerns in particular polyolefin compositions comprising (percent by weight):

A) from 20 to 60%, preferably from 30 to 45% by weight of a heterophasic olefin polymer composition comprising a crystalline olefin polymer (a) and an elastomeric olefin polymer (b), said composition (A) being optionally modified with at least one functional monomer in an amount from 0.005% to 0.6% by weight, preferably from 0.01% to 0.3%, referred to the total weight of the total composition;

B) from 15 to 40%, preferably from 18 to 35% by weight of one or more than one inorganic hydrated fillers;

C) from 12 to 40%, preferably from 22 to 35% by weight of one or more than one organic flame retardants containing nitrogen in the molecule;

D) from 0 to 40%, preferably from 10 to 25% by weight of one or more than one inorganic anhydrous fillers.

The compositions of the instant invention can be worked with the machines, in particular the extruders, normally used to work the thermoplastic polymers, without undergoing any subsequent thermosetting reaction. Moreover the compositions of the instant invention typically have a limiting oxygen index higher than or equal to 25 and are classified V0. V1 or V2 according to the UL 94 method (Underwriters Laboratories, "vertical burning test method"), keeping at the same time a good level of the other desired properties.

The heterophasic olefin polymer composition A) preferably comprises: (a) a portion consisting either of a crystalline propylene homopolymer, in particular isotactic polypropylene, or of one or more than one crystalline copolymers of propylene with ethylene and/or other alphaolefins, in particular $C_4$–$C_{10}$ alphaolefins e.g. 1-butene, 1-hexene, 1-octene and 4-methyl-1-pentene, or of a mixture of said homopolymer with said copolymers; and (b) a portion consisting of elastomeric olefin copolymer(s). Examples of said elastomeric olefin copolymers are ethylene-alphaolefin copolymers and ethylene-alphaolefin-diene terpolymers, wherein the alphaolefin preferably has 3 to 10 carbon atoms, e.g. propylene, 1-butene, 1-hexene, 1-octene and 4-methyl-1-pentene and the diene preferably is 1,3-butadiene, 1,4-hexadiene or 5-ethylidene-2-norbornene. In said elastomeric copolymers the ethylene content can range between 20 and 70% by weight whereas the diene, if present, is usually less or at most equal to 10% by weight. Particular examples of heterophasic compositions suitable as component A) are the heterophasic compositions comprising (percent by weight):

a) 10–60%, preferably 20–50%, of a propylene homopolymer with an isotacticity index value (determined as percent by weight of the polymer insoluble in xylene at 25° C.) higher than 80, preferably between 90 and 98, or a propylene crystalline copolymer with ethylene and/or $C_4$–$C_{10}$ alphaolefins containing at least 85% of propylene and having an isotacticity index value of at least 80 or a mixture thereof;

b) 0–40%, preferably 2–40%, more preferably 2–25%, of a copolymer fraction containing ethylene and insoluble in xylene at 25° C.;

c) 15–90%, preferably 15–78%, more preferably 30–75%, of an ethylene copolymer with propylene and/or $C_4$–$C_{10}$ alphaolefins and optionally a diene, containing 20–60% of ethylene and completely soluble in xylene at 25° C.;

the total content of ethylene in the heterophasic composition being from 15 to 60% by weight. Component b) is preferably an essentially linear, crystalline copolymer of ethylene with 0.5 to 20% by weight of propylene and/or $C_4$–$C_{10}$ alphaolefins. Examples of alphaolefins, possibly included in components a) and b), are 1-butene, 1-hexene, 1-octene and 4-methyl-1-pentene. The diene content in component c), if any, is usually not higher than 10% by weight. Said heterophasic compositions are preferably prepared by a sequential polymerization process in at least two steps using highly stereospecific Ziegler-Natta catalysts. Component a) is generally formed in the initial polymerization step whereas components b) and c) are formed in at least one successive polymerization step. Said process is particularly useful when component b) contains beside ethylene the same alphaolefins as component c), including propylene which is a preferred one.

Suitable catalysts comprise in particular the reaction product of a solid component, including a titanium compound and an electron donating compound (internal electron donor) supported on magnesium chloride, with an aluminumtrialkyl compound and an electron donating compound (external electron donor). Preferably the titanium compound is titanium tetrachloride. The internal donor is preferably selected from alkyl, cycloalkyl and aryl phthalates, in particular from diisobutyl phthalate, di-n-butyl phthalate and di-n-octyl phthalate. The external donor is preferably selected from silicon compounds having at least one —OR group, where R is a hydrocarbon radical, e.g. diphenyl-dimethoxysilane, methyl-t-butyl-dimethoxysilane, diisopropyl-dimethoxysilane, cyclohexyl-methyl-dimethoxysilane, dicyclopentyl-dimethoxysilane and phenyl-trietoxysilane.

Examples of said heterophasic compositions, along with polymerization processes and catalysts suitable for their preparation are described in the granted European Patents No. 400333 and 472946.

Said heterophasic compositions can also be obtained by mechanical mixing of the components a), b) and c) at a temperature higher than their softening or melting points. A mixture of the components b) and c) to be mechanically mixed with component a) can be prepared by copolymerizing ethylene with propylene and/or a $C_4$–$C_{10}$ alphaolefin and possibly a diene in the presence of a catalyst as described above.

The compositions of the present invention comprising said heterophasic polymer composition as component A) are quite suitable as insulating material for the coating of the electric cables, since they have high values of the elongation at break. Use of this property is also made in other applications such as the production of extruded sheets for waterproofing roofs and tunnels, raceways and pipes, extruded articles and gaskets.

Particularly preferred in the scope of the present invention are therefore the polyolefin compositions wherein component A) is an heterophasic composition of the above said type and the values of the elongation at break of the total composition are at least 125%, more preferably equal to or higher than 150%.

Component B) of the compositions of the instant invention consists, as said before, of one or more than one inorganic hydrated fillers in the form of a powder. The compounds usable as component B) are capable to release water when heated, with the consequent effect of subtracting heat to the combustion and diluting combustible gases deriving from the degradation of the polymeric matrix. In particular these compounds are capable to release water at a temperature equal to or higher than the combustion temperature of the polyolefin composition which includes them, such a combustion temperature being mainly determined by the nature of component A) and by the combustion environment.

Examples of said inorganic hydrated fillers are the metal hydroxides, e.g. $Mg(OH)_2$ or $Al(OH)_3$: salts like hydrated silicates, sulfates or carbonates containing water in the crystalline lattice or on their surface, e.g. hydrated magnesium carbonate; hydrated metal oxides, e.g. hydrated silica or alumina and mixed hydrated oxides of silicon and aluminum, as well as the mixtures of these compounds. Preferred are magnesium hydroxide, optionally mixed with hydrated magnesium carbonate, and aluminum hydroxide, most preferred is magnesium hydroxide. Particle dimensions are those of the typical inorganic fillers for polymers, i.e. usually less than 20 micron.

Component C) of the compositions of the present invention consists, as said before, of one or more than one organic compounds containing nitrogen, preferably selected from 1,3,5-triazines, urea, dicyandiamide, organic derivatives from these compounds or their salts. Most preferred compounds are melamine, acetoguanamine, benzoguanamine, ethylenurea and ethylenthiourea. Component D) of the compositions of the present invention consists of one or more than one inorganic anhydrous fillers. Examples of commonly used inert mineral fillers of this type are talc, calcined kaolin and some carbonates. Calcined kaolin, possibly after a suitable surface treatment, is preferred. The presence of these fillers improves the dispersion of the other components in the compositions and lets extruded articles with an improved surface be obtained. Moreover they help in getting a better balance of mechanical and self exstinguishing properties and in lowering the cost of the final composition. Also electrical properties are fairly improved by the presence of these fillers.

In order to improve the compatibility of the fillers with the polymeric components, component A) is usually modified with at least one polar functional monomer using a variety of methods to insert functional units in the polymer chains. For example, one can prepare a master polymer by grafting at least one polar monomer onto a propylene polymer backbone by using free radical initiators, such as organic peroxides, according to the method described in U.S. Patent No. 4,350,797 or by treating a propylene polymer in the particulate form with the polar monomers and radical initiators as described in European patent 572028. In both cases the master polymer so obtained is then blended in the molten state with component A). Preferably but not necessarily, the propylene polymer used in the preparation of said master polymer is the same as component A). It is also possible to blend the polar monomer(s) and radical initiators directly with the heterophasic component A) in the molten state. Such blending step in the molten state is carried out according to any of the known techniques, preferably operating in an inert atmosphere, such as under nitrogen, and with conventional equipment, such as internal mixers or single or twin-screw extruders, the blending temperature being preferably 180° C. to 230° C.

Most common polar monomers used in the modification of component A) contain at least a group selected from the carboxyl group and its derivatives. Preferred polar monomers are acrylic acid, methacrylic acid, itaconic acid, citraconic acid, fumaric acid, maleic acid and corresponding anhydrides and esters, and the unsaturated silanes e.g. vinyltrimethoxysilane. Particularly preferred is maleic anhydride. Whatever the method used to modify component A), the content of the polar monomers in the compositions of the present invention, when present, is comprised between 0.005 and 0.6%, preferably between 0.01 and 0.3% by weight, with reference to the total weight of the total composition.

Examples of free radical initiators which can be used in the modification of component A) with polar monomers are benzoyl peroxide, di-ter-butyl peroxide, 2,5-dimethyl-2,5-bis(ter-butyl peroxy)-hexane and azobisisobutyronitrile. The amount of the free radical initiator is usually from 0.006 to 0.6% by weight, preferably from 0.01 to 0.3% by weight, of the total weight of the modifying polymer.

In addition to the above components the compositions of the present invention may include other ingredients commonly used with the thermoplastic polymers, e.g. pigments, thermal antioxidants, ultraviolet absorbers, processing aids, filler dispersants, oils and waxes. Particularly useful are the filler dispersants, such as alkyltitanates and polydimethylsiloxanes, which are quite effective to improve surface aspect, mechanical properties and processing behaviour of the compositions.

Particularly preferred are the compositions of the present invention containing magnesium hydroxide, melamine and calcined kaolin, optionally in the presence of maleic anhydride. Compared with the compositions containing only magnesium hydroxide and melamine, the said compositions have a better balance of the physical mechanical properties related to the formulation costs, depending on the application. This is the case e.g. of the extruded sheets for waterproofing roofs and tunnels.

The compositions of the present invention are usually prepared using an internal mixer, e.g. a Banbury mixer, or a single screw extruder, e.g. a Buss extruder, or a double screw extruder, e.g. a Werner extruder. Mixing temperature is usually between 170° C. and 250° C.

The examples reported hereinafter are given just to illustrate the instant invention and not to limit its scope. In the examples the following components were used:

Heterophasic Composition No. 1:

Heterophasic composition having a MIL of 0.6–1 g/10 min with total ethylene content 20%, comprising (all percentages by weight):

a) 33% of a crystalline propylene random copolymer with 4.3% of ethylene, containing about 9% of a fraction soluble in xylene at 25° C. and having an intrinsic viscosity [η] of 1.5 dl/g;

b) 6% of an essentially linear ethylene/propylene copolymer with 94% of ethylene, totally insoluble in xylene at 25° C.; and c) 61% of an amorphous ethylene/propylene copolymer containing 21% of ethylene, totally soluble in xylene at 25° C., and having an intrinsic viscosity [η] of 3.2 dl/g.

Heterophasic Composition No. 2:

Heterophasic composition having a MIL of 6 g/10 min, with total ethylene content 16%, comprising (all percentages by weight):

a) 48% of crystalline propylene random copolymer with 3.5% of ethylene, containing about 7.5% of a fraction soluble in xylene at 25° C.;

b) 5% of an essentially linear ethylene/propylene copolymer with 90% of ethylene, totally insoluble in xylene at 25° C.; and c) 47% of amorphous ethylene/propylene copolymer with 21% of ethylene, totally soluble in xylene at 25° C., and having an intrinsic viscosity [η] of 2.3 dl/g.

Maleic Anhydride Additive No.1:

Heterophasic composition No. 1 in spherical form supporting 5% by weight of maleic anhydride and 1% by weight of 2,5-dimethyl-2,5-di(tert-butylperoxy)hexane.

Maleic Anhydride Additive No. 2:

Heterophasic composition No. 1 grafted with 1% by weight of maleic anhydride.

BY-27: 50% Silicone Gum (polydimethylsiloxane), marketed by Dow Corning.

Magnifin H5: magnesium hydroxide, marketed by Martinsweerk.

Securoc C: magnesium carbonate hydroxide, marketed by Incemin.

Whitetex: calcined kaolin, marketed by Engelhard.

Spinflam ML94M: micronized melamine, marketed by Montell.

Zn stearate: zinc stearate, marketed by Sogis.

Lica 12: neoalkyl titanates, marketed by Kenrich.

Irganox B225: pentaerythritol-tetrakis[3(3,5-di-tert-butyl-4-hydroxyphenyl)propionate] and tri(2,4-di-tert-butylphenyl)phosphite in equal amounts, marketed by Ciba Irganox 1010: pentaerythritol-tetrakis[3(3,5-di-tert-butyl-4-hydroxyphenyl)propionate], marketed by Ciba.

DSTDP (irganox PS802): distearyl thiodipropionate, marketed by Ciba.

All the compositions were obtained using a Banbury mixer, working at 90 rpm and at a temperature of 200° C. In a typical run, components were charged into the mixer altogether and the composition was discharged after 5 minutes mixing. Compositions were subsequently milled in order to be transformed by injection molding, compression molding or extrusion.

To characterize the compositions, plaques 120×120×3 mm were compression molded. The conditions of the molding were the following: 220° C. for 5 minutes without pressure and 3 minutes at 200 bar, followed by immediate cooling to 23° C.

The molecular and physical mechanical properties were determined according to the following methods:

Ethylene content: I.R. spectoscopy

Intrinsic viscosity: measure in tetrahydronaphtalene at 135° C.

Percentage of polymer soluble in xylene:

2.5 g of polymer were dissolved in 250 ml of xylene at 135° C. under agitation. After 20 minutes the solution was cooled down to 25° C., with agitation, and then it was allowed to settle for 30 minutes. The precipitate was filtered with filter paper, the solution was evaporated under a nitrogen current, and the residue dried under vacuum at 80° C. to a constant weight. The weight percentage of polymer soluble in xylene at room temperature was calculated.

| | |
|---|---|
| Melt Index L | ASTM D-1238, condition L |
| Flexural Modulus | ASTM D-1505 |
| Tensile strength at break | ASTM D-412 |
| Elongation at break | ASTM D-412 |
| Hardness Shore D | ASTM D-2240 |
| Volume resistivity | ASTM D-257 |
| Power factor | ASTM D150 |
| L.O.I. | ASTM D-2863-77 |
| Flame resistance | UL-94 testing for classification in Classes 94 V0, 94 V1, 94 V2 |

EXAMPLES

Some flame-proof formulations according to the invention and related characterization results are reported in Tables 1 and 2. Particularly significant are the compositions of Examples 3 and 4, which result quite suitable for the insulation of electrical cables.

Table 3 presents a few comparison examples which in particular point out the improvements in flame retardation properties obtained by using maleic anhydride as a filler compatibilizer, alone or preferably associated with polydimethylsiloxane to improve the dispersion of the fillers.

TABLE 1

Flameproof compositions

| | Example 1 % by weight | Example 2 % by weight | Example 3 % by weight | Example 4 % by weight |
|---|---|---|---|---|
| FORMULATION | | | | |
| Heterophasic composition No. 1 | 27 | 45 | 26 | 26 |
| Heterophasic composition No. 2 | 7 | — | 6 | 6 |
| Maleic anhydride additive No. 1 | — | 5 | — | — |
| Maleic anhydride additive No. 2 | — | — | 1.5 | 1.5 |
| Magnifin H5 | — | 25 | 30 | 32.5 |
| Securoc C | 20 | — | — | — |
| Whitetex | 20 | — | 20 | — |
| Spinflam ML94M | 25 | 25 | 15 | 32.5 |
| Zn stearate | — | — | 1.0 | 1.0 |
| Lica 12 | 0.8 | — | — | — |
| Irganox B225 | 0.2 | — | 0.10 | 0.10 |

TABLE 1-continued

Flameproof compositions

| | Example 1 % by weight | Example 2 % by weight | Example 3 % by weight | Example 4 % by weight |
|---|---|---|---|---|
| Irganox 1010 | — | — | 0.10 | 0.10 |
| DSTDP (Irganox PS802) | — | — | 0.30 | 0.30 |
| MIL g/min | — | — | 0.24 | 0.31 |
| PROPERTIES (compression molded plaque) | | | | |
| L.O.I. % | 25.8 | 28 | 27.2 | 26.7 |
| UL 94 (1.6 mm) class | — | — | V0 | V0 |
| UL 94 (3.2 mm) class | V0 | V2 | V0 | V0 |
| Flexural Modulus N/mm$^2$ | — | — | 780 | 595 |
| Tensile strength at break (a) N/mm$^2$ | 6.5 | 10.3 | 7.9 | 6.2 |
| Elongation at break (a) % | 180 | 355 | 200 | 233 |
| Hardness Shore D points | 52 | 45 | 47 | 44 |

(a) performed at 200 mm/minute

TABLE 2

Electrical properties of some flameproof compositions.

| PROPERTIES | Example 3 | Example 4 | PVC |
|---|---|---|---|
| VOLUME RESISTIVITY AT 25° C. | Ohm × cm | Ohm × cm | Ohm × cm |
| Initial (dry) | 2400.e$^{12}$ | 2000.e$^{12}$ | 788.e$^{12}$ |
| 1 day wet 80° C. | 594.e$^{12}$ | 441.e$^{12}$ | |
| 7 day wet 80° C. | 163.e$^{12}$ | 87.e$^{12}$ | |
| 21 day wet 80° C. | 58.e$^{12}$ | 22.e$^{12}$ | |
| 1 day wet 25° C. | | | 728.e$^{12}$ |
| 7 day wet 25° C. | | | 510.e$^{12}$ |
| 21 day wet 25° C. | | | 558.e$^{12}$ |
| POWER FACTOR | Tan Delta | Tan Delta | Tan Delta |
| Initial (dry) | 0.32 | 0.50 | 7.64 |
| 1 day wet 80° C. | 3.40 | 8.16 | |
| 7 day wet 80° C. | 14.76 | 18.44 | |
| 21 day wet 80° C. | 16.35 | 16.35 | |
| 1 day wet 25° C. | | | 7.56 |
| 7 day wet 25° C. | | | 7.46 |
| 21 day wet 25° C. | | | 7.28 |

TABLE 3

| | Comparative examples | | | | |
|---|---|---|---|---|---|
| FORMULATION | Comparative example 1 % by weight | Comparative example 2 % by weight | Comparative example 3 % by weight | Comparative example 4 % by weight | Comparative example 5 % by weight |
| Heterophasic composition No. 1 | 40 | 38 | 36 | 32 | 30.8 |
| Maleic anhydride additive No. 1 | — | 2 | 4 | — | 2 |
| BY-27 | — | — | — | 8 | 7.2 |
| Magnifin H5 | 60 | 60 | 60 | 60 | 60 |
| PROPERTIES (compression molded plaque) | | | | | |
| L.O.I. % | 26.8 | 28.6 | 28 | 28.6 | >35 |
| UL 94 (3.2 mm) class | B | V2 | V2 | B | B |

What is claimed is:

1. Flame-proof polyolefin compositions comprising:
    A) from 20 to 60% by weight of a heterophasic olefin polymer composition comprising a crystalline olefin polymer (a) and an elastomeric olefin polymer (b), said composition (A) being optionally modified with at least one functional monomer in an amount from 0.005% to 0.6% by weight with respect to the weight of the total composition;
    B) from 15 to 40% by weight of one or more inorganic hydrated fillers;
    C) from 12 to 40% by weight of one or more organic flame retardants containing nitrogen; and
    D) from 0 to 40% by weight of one or more inorganic anhydrous fillers.

2. Flame-proof polyolefin compositions according to claim 1 comprising:
    A) from 30 to 45% by weight of a heterophasic olefin polymer composition comprising a crystalline olefin polymer (a) and an elastomeric olefin polymer (b), said composition (A) being optionally modified with at least one functional monomer in an amount from 0.005% to 0.6% by weight with respect to the weight of the total composition;
    B) from 18 to 35% by weight of one or more inorganic hydrated fillers;
    C) from 22 to 35% by weight of one or more organic flame retardants containing nitrogen; and
    D) from 0 to 40% by weight of one or more inorganic anhydrous fillers.

3. Flame-proof polyolefin compositions according to claim 1 comprising:
    A) from 30 to 45% by weight of a heterophasic olefin polymer composition comprising a crystalline olefin polymer (a) and an elastomeric olefin polymer (b), said composition (A) being optionally modified with at least one functional monomer in an amount from 0.01% to 0.3% by weight with respect to the weight of the total composition;
    B) from 18 to 35% by weight of one or more inorganic hydrated fillers;
    C) from 22 to 35% by weight of one or more organic flame retardants containing nitrogen; and
    D) from 10 to 25% by weight of one or more inorganic anhydrous fillers.

4. Flame-proof polyolefin compositions according to claim 1 wherein component A) is a heterophasic composition comprising (percent by weight):
    a) 10–60% of a propylene homopolymer with an isotacticity index value, determined as percent by weight of the polymer insoluble in xylene at 25° C., higher than 80 or of a propylene crystalline copolymer with at least one of ethylene and $C_4$–$C_{10}$ alphaolefins containing at least 85% of propylene and having an isotacticity index value of at least 80, or of mixtures thereof;
    b) 0–40% of a copolymer fraction containing ethylene and insoluble in xylene at 25° C.; and
    c) 15–90% of an ethylene copolymer with at least one of propylene and $C_4$–$C_{10}$ alphaolefins, and optionally a diene, the ethylene copolymer containing 20–60% of ethylene and being completely soluble in xylene at 25° C.;
said heterophasic composition having a total content of ethylene from 15 to 60% by weight and being optionally modified with the at least one functional monomer.

5. Flame-proof polyolefin compositions according to claim 4 wherein component A) is a heterophasic composition comprising (percent by weight):
    a) 20–50%, of a propylene homopolymer with an isotacticity index value, determined as percent by weight of the polymer insoluble in xylene at 25° C., between 90 and 98, or of a propylene crystalline copolymer with at least one of ethylene and $C_4$–$C_{10}$ alphaolefins containing at least 85% of propylene and having an isotacticity index value of at least 80, or of mixtures thereof;
    b) 2–25%, of an essentially linear ethylene copolymer containing from 0.5 to 20% by weight of at least one of propylene and $C_4$–$C_{10}$ alphaolefins; and
    c) 30–75%, of an ethylene copolymer with at least one of propylene and $C_4$–$C_{10}$ alphaolefins, and optionally a diene, the ethylene copolymer containing 20–60% of ethylene and 0–10% of the diene and being completely soluble in xylene at 25° C.;
said heterophasic composition being optionally modified with the at least one functional monomer.

6. Flame-proof polyolefin compositions according to claim 4 having a value of the elongation at break equal to or higher than 125%.

7. Flame-proof polyolefin compositions according to claim 1 wherein component B) is selected from the group consisting of magnesium hydroxide, aluminum hydroxide, and mixtures of magnesium hydroxide and hydrated magnesium carbonate.

8. Flame-proof polyolefin compositions according to claim 1 wherein component C) is selected from the group consisting of 1,3,5-triazine, urea, dicyandiamide and organic derivatives from these compounds or their salts.

9. Flame-proof polyolefin compositions according to claim 8 wherein component C) is selected from the group consisting of melamine, acetoguanamine, benzoguanamine, ethyleneurea and ethylenethiourea.

10. Flame-proof polyolefin compositions according to claim 1 wherein component D) is selected from the group consisting of talc, calcined kaolin and inorganic carbonates.

11. Flame-proof polyolefin compositions according to claim 10 wherein component D) is calcined kaolin.

12. Flame-proof polyolefin compositions according to claim 1 wherein the functional monomer optionally modifying component A) is selected from the group consisting of acrylic acid, methacrylic acid, itaconic acid, citraconic acid, fumaric acid, maleic acid and corresponding anhydrides and esters and unsaturated silanes.

13. Flame-proof polyolefin compositions according to claim 12 wherein the functional monomer is maleic anhydride.

14. Flame-proof polyolefin compositions according to claim 1 further comprising additives selected from the group consisting of pigments, thermal antioxidants, ultraviolet absorbers, processing aids, filler dispersants, oils and waxes.

15. Flame-proof polyolefin compositions according to claim 14 wherein the filler dispersants are selected from the group consisting of alkyltitanates and polydimethylsiloxanes.

16. Flame-proof polyolefin compositions according to claim 1 wherein:

A) is a heterophasic composition according to component A in claim 5, modified with maleic anhydride;

B) is selected from the group consisting of magnesium hydroxide and mixtures of magnesium hydroxide and hydrated magnesium carbonate;

C) is melamine; and

D) is calcined kaolin.

17. Flame-proof polyolefin compositions according to claim 16 further comprising additives selected from the group consisting of pigments, thermal antioxidants, ultraviolet absorbers, processing aids, filler dispersants, oils and waxes.

18. Flame-proof polyolefin compositions according to claim 17 wherein the filler dispersants are selected from the group consisting of alkyltitanates and polydimethylsiloxanes.

* * * * *